United States Patent
Lee et al.

(10) Patent No.: US 7,436,855 B2
(45) Date of Patent: Oct. 14, 2008

(54) PROHIBIT OR AVOID ROUTE MECHANISM FOR PATH SETUP

(75) Inventors: Cheng-Yin Lee, Ottawa (CA); Stefaan Jozef De Cnodder, Lille (BE)

(73) Assignee: Alcatel Lucent, Paris (FR)

( * ) Notice: Subject to any disclaimer, the term of this patent is extended or adjusted under 35 U.S.C. 154(b) by 946 days.

(21) Appl. No.: 10/369,567

(22) Filed: Feb. 21, 2003

(65) Prior Publication Data

US 2004/0165537 A1    Aug. 26, 2004

(51) Int. Cl.
H04J 3/16    (2006.01)

(52) U.S. Cl. .................. 370/471; 370/235; 370/392; 370/395.5; 709/239

(58) Field of Classification Search ......... 370/216–218, 370/221, 230, 235, 248, 352–356, 400, 465, 370/392, 395.5, 471; 709/238–240, 243
See application file for complete search history.

(56) References Cited

U.S. PATENT DOCUMENTS

| | | | | |
|---|---|---|---|---|
| 6,006,264 | A * | 12/1999 | Colby et al. | 709/226 |
| 7,080,161 | B2 * | 7/2006 | Leddy et al. | 709/250 |
| 7,095,738 | B1 * | 8/2006 | Desanti | 370/389 |
| 2001/0013067 | A1 * | 8/2001 | Koyanagi et al. | 709/230 |
| 2002/0191545 | A1 | 12/2002 | Pieda et al. | |
| 2003/0026268 | A1 * | 2/2003 | Navas | 370/400 |
| 2003/0227919 | A1 * | 12/2003 | Zelig et al. | 370/392 |
| 2004/0010596 | A1 * | 1/2004 | Hui | 709/228 |
| 2004/0039839 | A1 * | 2/2004 | Kalyanaraman et al. | 709/238 |
| 2004/0165537 | A1 * | 8/2004 | Lee et al. | 370/252 |
| 2005/0232231 | A1 * | 10/2005 | Miyabe | 370/351 |

FOREIGN PATENT DOCUMENTS

| | | | |
|---|---|---|---|
| EP | 1126678 A1 * | 8/2001 | |
| WO | WO 03/005649 A1 | 2/2003 | |
| WO | WO 2004107126 A2 * | 12/2004 | |

OTHER PUBLICATIONS

Deering, S. et al., "Internet Protocol, Version 6 (IPv6) Specification," Request for Comments: 1883, Dec. 1995, pp. 1-37.*
Cy Lee et al, "Exclude Routes—Extension to RSVP-TE",IETF Standard-Working-DraftI,nternet Engineering Task Force, IETF, CH. No. 1, Nov. 2002.
Cy Lee et al, "Exclude Routes—Extension to RSVP-TE", <draft-ietf-ccamp-rsvp-te-exclude-route-00.txt> IETF Standard-Working-Draft,Internet Engineering Task Force, IETF, CH. Vol. ccamp, Jun. 2003.

* cited by examiner

*Primary Examiner*—Chi H. Pham
*Assistant Examiner*—Donald L Mills

(57) ABSTRACT

The present invention discloses a solution which delivers routing systems with less path setup latency and causes them to be less susceptible to network loading, by providing them the ability to setup diverse paths as a result of specifying network resources to exclude as part of a path setup. The invention proposes an extension to RSVP-TE in the form of a new RSVP-TE object, known as an Exclude Route Object, which will allow, in a path setup request, the specification of a set of abstract nodes and resources to be explicitly excluded from the path. Additionally, the invention introduces a second type of exclusion which is achieved through a modification to the existing Explicit Route Object (ERO) by allowing a node to specify, in a path setup request, the exclusion of certain abstract nodes and resources between a specific pair of abstract nodes within an Explicit Route Object.

18 Claims, 5 Drawing Sheets

PROHIBIT OR AVOID ROUTE MECHANISM FOR PATH SETUP

FIELD OF THE INVENTION

The invention relates to setting up paths in an MPLS network, particularly setting up disjoint LSP paths between areas and domains of a network. Specifically, the invention relates to the RSVP-TE specification with MPLS/GMPLS extensions for inter-area and inter-domain path setup.

BACKGROUND OF THE INVENTION

As the number of different implementations for routing grows, the requirements have become more stringent on routing systems. Contemporary systems have some, but not all, of the desirable properties required for adequate routing. The conventional RSVP-TE specification (RSVP-TE) and GMPLS extensions (GMPLS-RSVP-TE) allow network resources to be explicitly included in a path setup, but not to be explicitly excluded. In some cases it is advantageous to exclude a network resource, such as a highly utilized or congested route, node, link, or system from routes. The consequence of not excluding these resources is that the congested network resource becomes a bottleneck limiting the capability and scalability of the routing system.

In some networks, exclusions can be specified during centralized path computation, and an explicit route which exclude the resources specified is generated as a result. This method is referred to as the Route Server Approach. Other systems, however, rely on the use of loose routes or partially specified abstract nodes. These loose routes are resolved within the network as the hops of the explicit route are evaluated. In these cases exclusions cannot currently be communicated to the nodes that evaluate the routes.

The Route Server Approach suffers from a number of other limitations. It may need to perform many simultaneous path computations across more than one area. This reduces the rapidity of the routing system and causes it to be vulnerable to network loading. For e.g., the route server would need to acquire the link state database of all the areas or Autonomous Systems where the path traverses in order to be able to compute a diverse path.

In light of the foregoing, it can be seen that there exists a need for a mechanism that possesses the ability to setup diverse paths as a result of specifying network resources to exclude as part of a path setup.

The present invention addresses the inability of RSVP-TE and CR-LDP to allow nodes to signal routes or links to exclude in a path setup request. The current RSVP-TE specification (RSVP-TE) and GMPLS extensions (GMPLS-RSVP-TE) allow abstract nodes and resources to be explicitly included in a path setup, using the Explicit Route Object, but not to be explicitly excluded.

Although various prior art routing systems have heretofore been extant for sometime, no such system is known to have all of the advantages and novel features of the system described, and claimed, hereinbelow.

SUMMARY OF THE INVENTION

To overcome the limitations of the prior art described above, and to overcome other limitations that will become apparent upon reading and understanding the present specification, the present invention discloses a solution which delivers routing systems with less path setup latency and causes them to be less susceptible to network loading, by providing them the ability to setup diverse paths as a result of specifying network resources to exclude as part of a path setup.

The present invention addresses the inability of RSVP-TE and CR-LDP to allow nodes to signal routes or links to exclude in a path setup request.

The invention proposes an extension to RSVP-TE in the form of a new RSVP-TE object, known as an Exclude Route Object, which will allow, in a path setup request, the specification of a set of abstract nodes and resources to be explicitly excluded from the path.

Additionally, the invention introduces a second type of exclusion which is achieved through a modification to the existing Explicit Route Object (ERO) by allowing a node to specify, in a path setup request, the exclusion of certain abstract nodes and resources between a specific pair of abstract nodes within an Explicit Route Object.

DETAILED DESCRIPTION OF THE INVENTION

It is to be understood that the following description is merely illustrative of the principles of the invention and that other arrangements may be devised by those skilled in the art. The general principles defined herein may be applied to other embodiments and applications without departing from the spirit and scope of the present invention. Thus, the present invention is to be accorded the widest scope consistent with the principles and features disclosed herein.

It will be generally understood that the terms "node", "abstract node" and "network resource" as used hereinafter are interchangeable. Also, it will be generally understood that the term "network resource" as used hereinafter may refer to a single node, a group of nodes, a route, a link, or an Autonomous System. In addition, it will be generally understood that the terms "exclude" and "avoid" as used in this document are interchangeable.

Generally, the present invention provides an improved routing system which overcomes the shortcomings of the conventional RSVP-TE and CR-LDP. The present invention addresses the inability of RSVP-TE and CR-LDP to allow nodes to signal routes or links to exclude in a path setup request.

The current RSVP-TE specification (RSVP-TE) and GMPLS extensions (GMPLS-RSVP-TE) allow abstract nodes and resources to be explicitly included in a path setup, using the Explicit Route Object (hereinafter referred to as ERO), but not to be explicitly excluded. The invention proposes an extension to RSVP-TE in the form of a new RSVP-TE object, known as an Exclude Route Object (hereinafter referred to as XRO). The XRO will allow, in a path setup request, the specification of a set of abstract nodes and resources to be explicitly excluded from the path {e.g., exclude(A, B, C, D)}. The set of abstract nodes, which are not to be included in a given set anywhere on the path, is referred to as the Exclude Route List.

Figure 1:
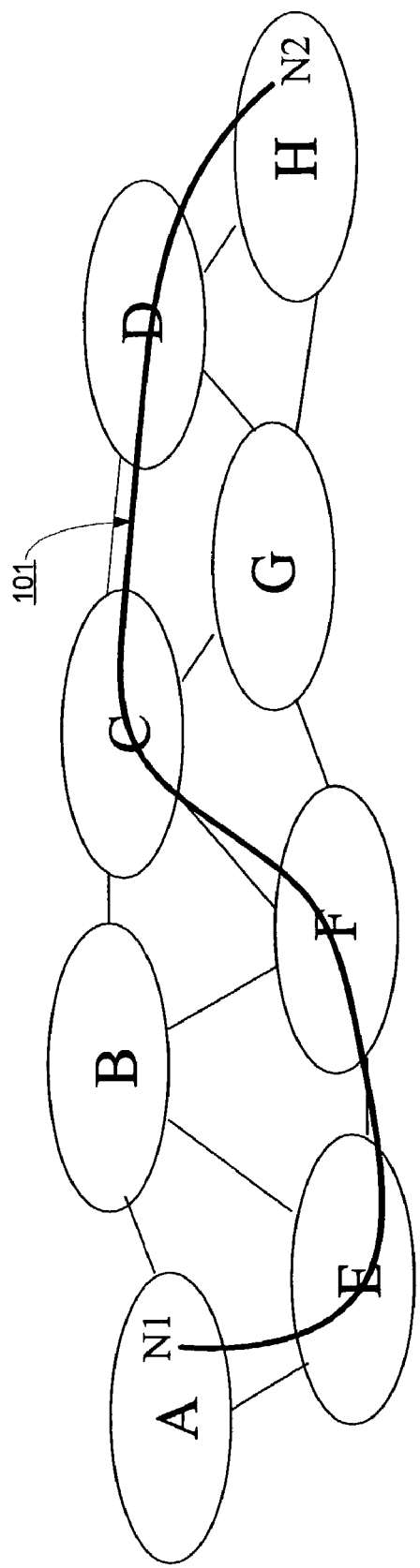
FIG. 1 shows an example application of the invention to exclude a set of abstract nodes from a path.

FIG. 1 is used to illustrate this method. A single node N1 in abstract node 'A' requests a path setup to another single node N2 in abstract node 'H', specifying that abstract nodes 'B' and 'G' are to be excluded {exclude(B, G)}. The resultant path 101 is from N1 in abstract node 'A', through abstract nodes 'E', 'F', 'C', and 'D' to N2 in abstract node 'H'.

Additionally, the invention introduces a second type of exclusion which is achieved through a modification to the existing ERO by allowing a node to specify, in a path setup request, the exclusion of certain abstract nodes and resources between a specific pair of abstract nodes within an ERO {e.g., (W, excludeX, excludeY, Z)}. A new subobject type, the Exclude Object Subobject, is introduced to indicate an exclusion between a pair of included abstract nodes. Such specific exclusions are referred to as Explicit Route Exclusions.

Figure 2:
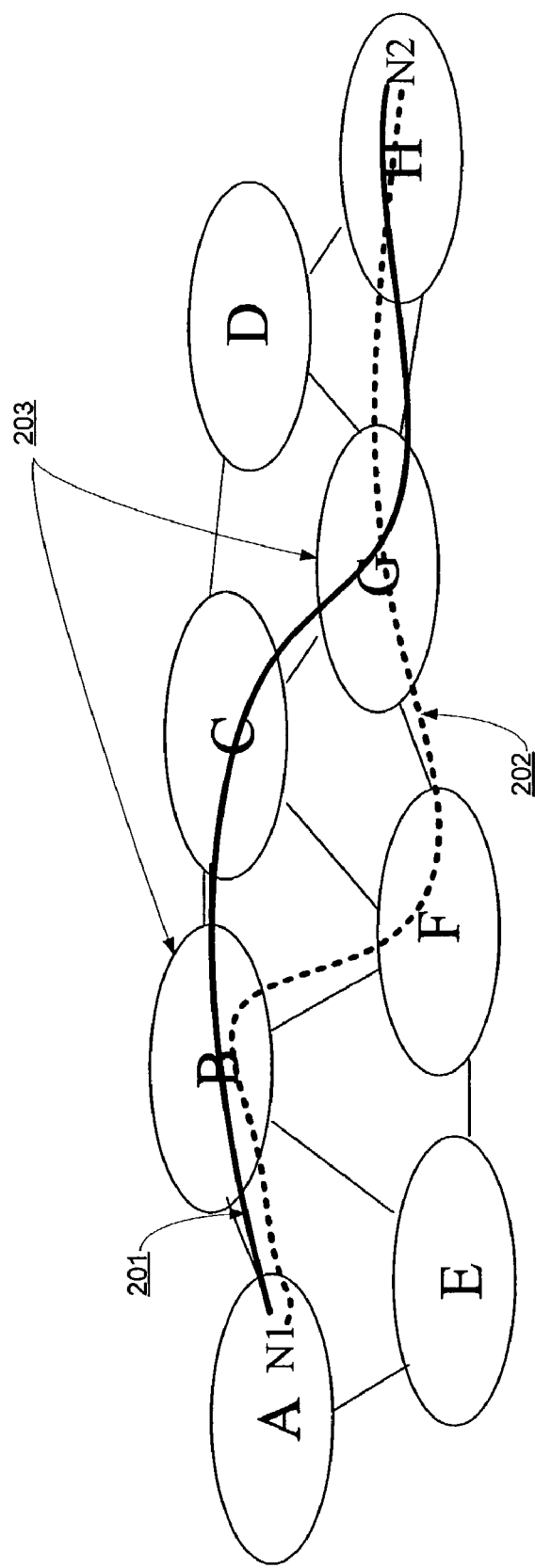
FIG. 2 shows an example application of the invention to exclude a set of abstract nodes between a specific pair of abstract nodes within an Explicit Route Object (ERO).

FIG. 2 is used to illustrate this method. A single node N1 in abstract node 'A' requests a second path setup to another single node N2 in abstract node 'H', specifying to exclude intermediate abstract node 'C' from between a pair of abstract nodes 203, which are a part of the ERO path 201. The resultant second path 202 is from N1 in abstract node 'A', through abstract nodes 'B', 'F', and 'G' to N2 in abstract node 'H'.

Protection LSPs are often setup to be node diverse from the LSPs they protect. Node diversity is required as well if the network elements do not have Equipment protection. Shared Risk Link Groups (SRLGs) provide a means to identify nodes that share the same risks {e.g., same fibre duct, same fibre, different physical links in the same building, or traversing the same geographical area}. Hence nodes with the same SRLG should be avoided when setting up the protection LSP. The invention introduces an ERO subobject to indicate an SRLG to be excluded.

The subsequent paragraphs will discuss the Exclude Route List of the XRO and the Explicit Route Exclusions of the ERO in more detail, to provide a better understanding of the invention.

The Exclude Route List identifies a list of abstract nodes that must not be traversed along the path. Abstract nodes to be excluded from a path are specified via the XRO. The XRO is encoded as a series of subobjects (variable-bit-length data items). Each subobject identifies an abstract node in the Exclude Route List.

The subobjects are identical in format to those defined in RSVP-TE and GMPLS-RSVP-TE for use in EROs. Each subobject includes a "resource type" field to indicate the type of the resource; an "action" field to indicate the action to be taken with respect to the resource; a "transparence flag", which when set, allows messages with unknown "resource types" or "actions" to be ignored and forwarded transparently; a "reserved" field that is set to zero on transmission and ignored on receipt; a "length" field to indicate the length of the "resource" field in bytes; a "resource" field to identify the resource; and a "padding" field, which is of variable length and is used to align the length of the subobject to a four-octet boundary.

In RSVP-TE, a node may be an abstract node, which is made up of a group of nodes as in an Autonomous System (AS). Hence an exclude route that consists solely of AS subobjects specifies the ASs not to be traversed.

Figure 3:
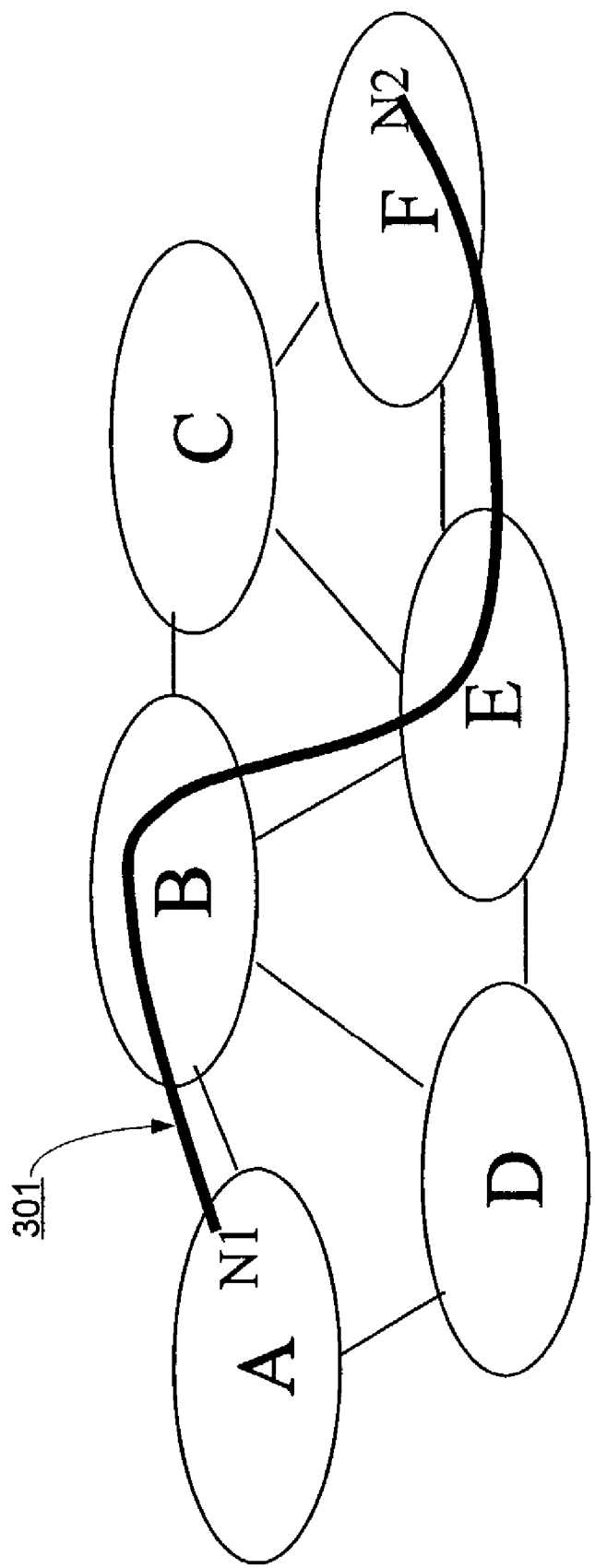
FIG. 3 shows an example application of the invention to avoid a highly utilized node in an Autonomous System (AS).

Referring to FIG. 3, a node N1 in AS 'A' requests a path setup to another node N2 in AS 'F', specifying that AS 'C' is to be excluded. The resultant path 301 is from N1 in AS 'A', through AS 'B' and AS 'E', to N2 in AS 'F'.

When a node receives, and is present in, a path message, it must check if it is on the Exclude Route List or a part of any SRLG. If either proves to be true, the node should return a message indicating a routing problem, which calls for the re-routing of the LSP.

When selecting the next network resource to expand an explicit route, a node must not nominate an explicit node or an abstract node that is specified by the XRO or in the SRLG subobjects. If that prevents further expansions of the path message, the node should return a message indicating a routing problem, which calls for the re-routing of the LSP. Furthermore, if a node is required to process an Exclude Object Subobject and does not support the handling of exclusions it will return an error message as well.

Explicit Route Exclusions allow a node to specify, in a path setup request, the exclusion of certain abstract nodes and resources that should not be utilized between two inclusive abstract nodes or resources in the explicit route.

The Explicit Route Object (ERO) specifies the abstract nodes and resources to be excluded from the path by defining new subobject values. The most significant bit of the subobject value would indicate whether the subobject is to be excluded or not.

An alternative way to accomplish Explicit Route Exclusions would be for the ERO to specify the abstract nodes and resources to be excluded from the path by defining a new Class Type, the Explicit Exclusion Route Subobjects (hereinafter referred to as EXRS). The EXRS is an ERO subobject with the same values but with extended subobjects to indicate exclusions. It includes a "type" field to indicate the type of the subobject (i.e., EXRS type) as well as information indicating which network resources should be excluded.

The exclusion approach can be exploited to allow the setup of inter-area and inter-domain diverse routes. For inter-area path setup, the nodes that evaluate the routes are the Area Border Routers (hereinafter referred to as ABR).

The ingress node may compute the explicit route up to the ABR and then send a setup message to the ABR specifying the route to exclude. The path is setup according to the setup message, which goes through every route specified in the explicit route, until it reaches an ABR. At that point the ABR computes the route for the next area, excluding resources specified in the XRO. The ABR then inserts into the setup message the computed explicit route. The path is then setup until the setup message reaches the next ABR. The next ABR then computes the path to the destination applying any XRO in the setup message.

Where an ingress node can not compute the explicit route for the whole path {e.g., A-B-C-D-E-F-G} it specifies a loose route {e.g., A-B,F-G} in a setup message that it sends to {B}. When {B} receives the setup message it would compute the route to {G} {e.g., C-D-E}, avoiding any resources that have been specified as XRO in the setup message. Then {B} would insert {C,D,E} into the explicit route and forward the setup message to {F}. {B} would also remove {A-B} from the explicit route in the setup message since these nodes have already been traversed.

Figure 4:
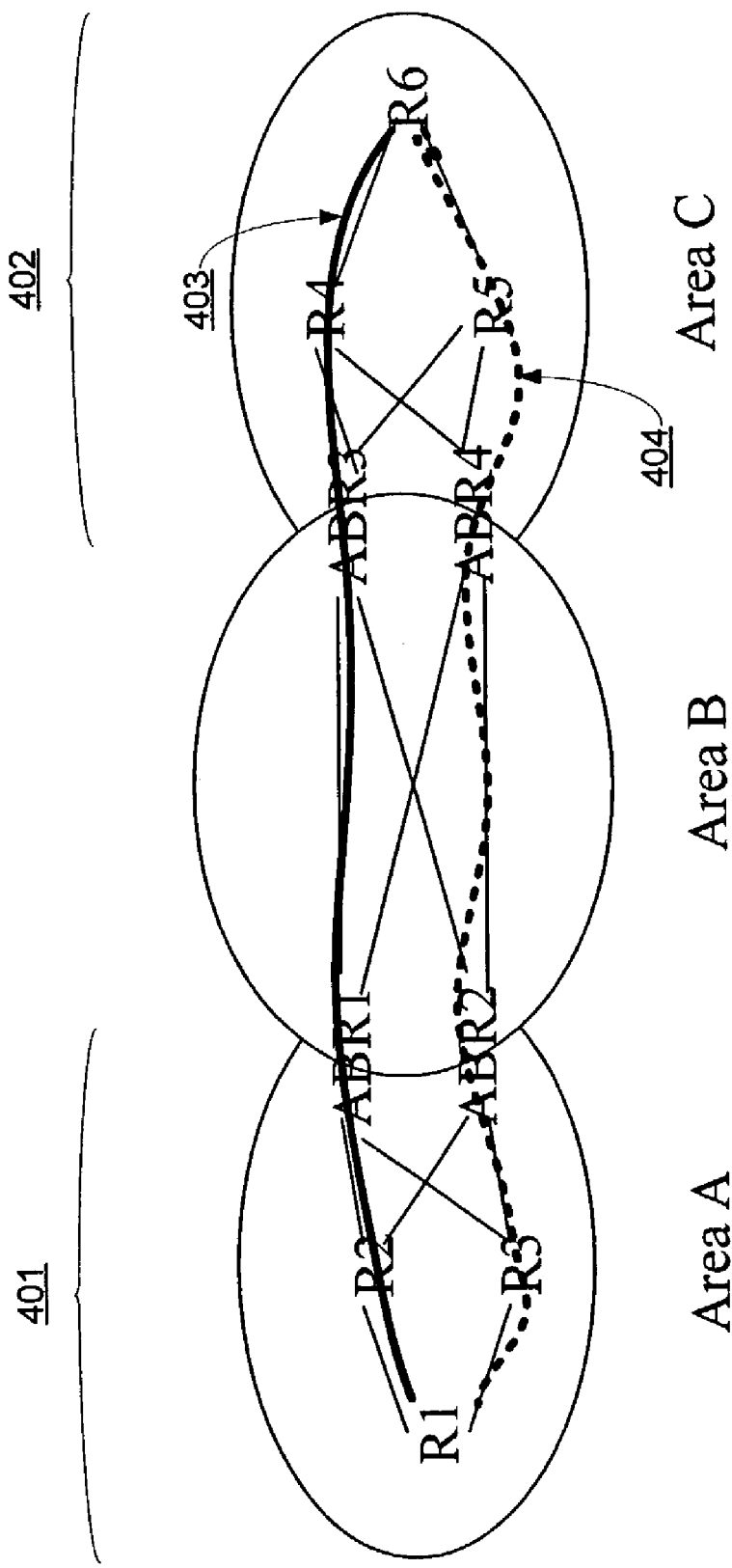
FIG. 4 shows an example application of the invention to setup inter-area diverse routes.

Referring to FIG. 4, router R1 in area A 401 requests a first path setup (and record route) to router R6 in area C 402. The first path route 403 is R1, R2, ABR1, ABR3, R4, and R6. The router R1 requests a second path setup to router R6 specifying to exclude the route of the first path (i.e., R2, ABR1, ABR3, and R4). The resultant diverse route 404 for the second path is R1, R3, ABR2, ABR4, R5, and R6.

Figure 5:
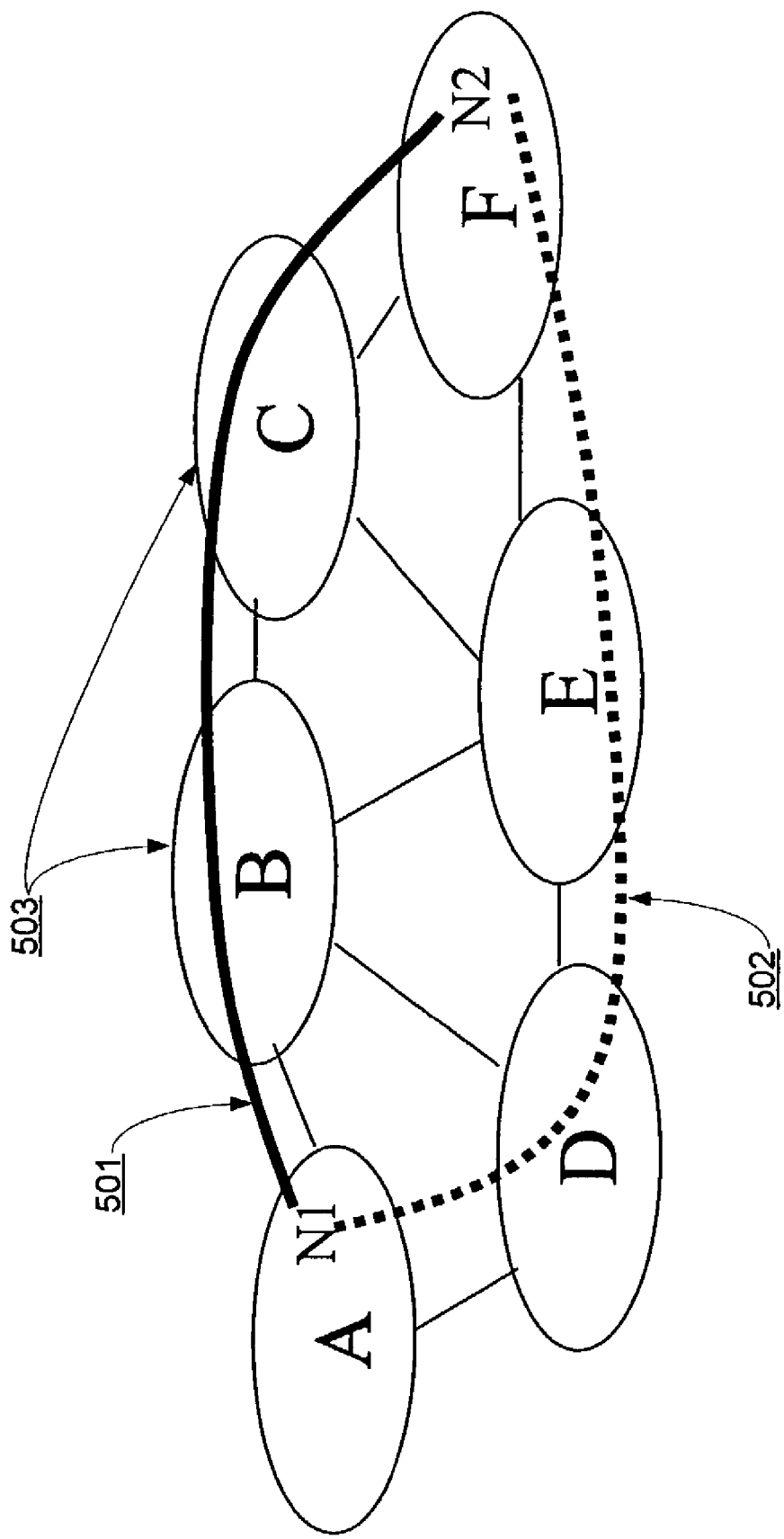
FIG. 5 shows an example application of the invention to setup inter-domain diverse routes.

Referring to FIG. 5, a node N1 in AS-A requests a first path setup (and record AS's traversed, which requires a new AS subobject in Request Route Object RRO) to another node N2 is AS-F. The first path 501 is AS-A, AS-B, AS-C, and AS-F. Then node N1 requests a second path setup to node N2, specifying to exclude intermediate AS's 503 of the first path. The resultant second path 502 is AS-A, AS-D, AS-E, and AS-F.

We claim:

1. A method for establishing a path between a first node and a second node in a network in which said first node and said second node are in separate portions of said network, comprising the steps of:
   (a) determining, by said first node, a loose route for said path to said second node;
   (b) sending, by said first node to a third node, which is in a separate portion of said network than said first node and said second node, and is a part of said loose route, a path setup message that specifies said loose route and also specifies any network resources to exclude from said path;
   (c) determining, by said third node, a route from said third node to said second node wherein the determined route excludes said network resources to be excluded from said path;
   (d) modifying, by said third node, said path setup message by inserting said determined route therein; and
   (e) sending, by said third node, the modified path setup message to said second node, for completing establishment of said path.

2. The method of claim 1, wherein said determined route of step (c) includes at least one other node, which:
   (i) is in a separate portion of said network than said first node, said second node, and said third node;
   (ii) is a part of said determined path and is located between said third node and said second node; and
   (iii) functions in the same manner as said third node wherein modified path setup message would be treated as said path setup message.

3. The method of claim 1, wherein step (c) further comprises said third node checking if said third node is a member of said network resources to be excluded from said path.

4. The method as set forth in claim 3, further including sending by said third node an error message to said first node, if said third node was found to be a member of said network resources to be excluded from said path.

5. The method of claim 2, further comprising said other node checking if said other node is a member of said network resources to be excluded from said path.

6. The method as set forth in claim 5, further including sending by said other node an error message to the node preceding said other node, if said other node was found to be a member of said network resources to be excluded from said path.

7. The method of claim 1, wherein:
   (i) said network is comprised of diverse areas;
   (ii) said first node and said second node are located in two different said diverse areas of said network; and
   (iii) said third node is comprised of an area border router (ABR).

8. The method of claim 1, wherein:
   (i) said network comprises diverse domains; and
   (ii) said first node, said second node, and said third node are located in different said diverse domains of said network.

9. The method of claim 1, wherein said network resources of steps (b) and (c) are specified in an Exclude Route Object as part of the path setup message.

10. A system for establishing a path between a first node and a second node in a network in which said first node and said second node are in separate portions of said network, comprising:
    (a) means for determining, by said first node, a loose route for said path to said second node;
    (b) means for sending from said first node to a third node, which is in a separate portion of said network than said first node and said second node, and is a part of said loose route, a path setup message that specifies said loose route and also specifies any network resources to exclude from said path;
    (c) means for determining, by said third node, a route from said third node to said second node wherein the determined route excludes said network resources to be excluded from said path;
    (d) means for modifying, by said third node, said path setup message by inserting said determined route therein; and
    (e) means for sending, by said third node, the modified path setup message to said second node, for completing establishment of said path.

11. The system defined in claim 10 wherein said determined route includes at least one other node, which:
    (i) is in a separate portion of said network than said first node, said second node, and said third node;
    (ii) is a part of said determined path and is located between said third node and said second node; and
    (iii) functions in the same manner as said third node wherein modified path setup message would be treated as said path setup message.

12. The system of claim 10, further comprising means for checking, by said third node, if said third node is a member of said network resources to be excluded from said path.

13. The system as set forth in claim 12, further comprising means for sending, by said third node, an error message to said first node, if said third node was found to be a member of said network resources to be excluded from said path.

14. The system of claim 11, further comprising, means for checking, by said other node, if said other node is a member of said network resources to be excluded from said path.

15. The system as set forth in claim 14, further comprising means for sending, by said other node, an error message to the node preceding said other node, if said other node was found to be a member of said network resources to be excluded from said path.

16. The system of claim 10, wherein:
    (i) said network is comprised of diverse areas;
    (ii) said first node and said second node are located in two different said diverse areas of said network; and
    (iii) said third node is comprised of an area border router (ABR).

17. The system of claim 10, wherein:
    (i) said network comprises diverse domains; and
    (ii) said first node, said second node, and said third node are located in different said diverse domains of said network.

18. The system of claim 10, wherein said network resources of steps (b) and (c) are specified in an Exclude Route Object as part of the path setup message.

* * * * *